US012779822B2

(12) United States Patent
Matsuo et al.

(10) Patent No.: US 12,779,822 B2
(45) Date of Patent: Nov. 3, 2026

(54) LAMINATE

(71) Applicant: TOYOBO CO., LTD., Osaka (JP)

(72) Inventors: Keisuke Matsuo, Otsu (JP); Tetsuo Okuyama, Otsu (JP)

(73) Assignee: TOYOBO CO., LTD., Osaka (JP)

( * ) Notice: Subject to any disclaimer, the term of this patent is extended or adjusted under 35 U.S.C. 154(b) by 20 days.

(21) Appl. No.: 18/566,488

(22) PCT Filed: Jul. 14, 2022

(86) PCT No.: PCT/JP2022/027751
§ 371 (c)(1),
(2) Date: Dec. 1, 2023

(87) PCT Pub. No.: WO2023/002919
PCT Pub. Date: Jan. 26, 2023

(65) Prior Publication Data

US 2024/0246319 A1 Jul. 25, 2024

(30) Foreign Application Priority Data

Jul. 20, 2021 (JP) ................................ 2021-119890

(51) Int. Cl.

| | |
|---|---|
| ***B32B 15/08*** | (2006.01) |
| ***B32B 7/12*** | (2006.01) |
| ***B32B 15/18*** | (2006.01) |
| ***B32B 15/20*** | (2006.01) |
| ***B32B 27/28*** | (2006.01) |

(52) U.S. Cl.
CPC ................ *B32B 15/08* (2013.01); *B32B 7/12* (2013.01); *B32B 15/18* (2013.01); *B32B 15/20* (2013.01); *B32B 27/281* (2013.01); *B32B 2307/306* (2013.01); *B32B 2307/7376* (2023.05); *B32B 2457/00* (2013.01); *B32B 2457/12* (2013.01)

(58) Field of Classification Search
CPC ......... B32B 15/08; B32B 7/12; B32B 27/281; B32B 2307/7376; B32B 2457/12; B32B 15/082; B32B 15/20; B32B 27/00; B32B 27/08; B32B 27/283; B32B 7/027; B32B 15/18; B32B 2307/306; B32B 2307/308; B32B 2311/12; B32B 2311/22; B32B 2311/30; B32B 2457/00; B32B 2457/10; C09J 183/04; H01B 5/14; H10F 19/85; Y02E 10/50
See application file for complete search history.

(56) References Cited

U.S. PATENT DOCUMENTS

2010/0233476 A1* 9/2010 Uchida ............. C08G 73/1064 524/592
2011/0088933 A1* 4/2011 Amou ................... H05K 3/385 174/257
2013/0310486 A1* 11/2013 Kawakusu ........... C08G 18/346 523/451
2014/0162053 A1 6/2014 Lee et al.
2017/0225433 A1 8/2017 Okuyama et al.
2019/0134963 A1 5/2019 Hara et al.
2020/0307157 A1 10/2020 Blohowiak et al.
2020/0377767 A1 12/2020 Hirai et al.
2022/0009143 A1 1/2022 Kim et al.
2022/0274314 A1 9/2022 Okuyama et al.

FOREIGN PATENT DOCUMENTS

JP H01-174439 A 7/1989
JP H11-121148 A 4/1999
JP 2006147662 A * 6/2006
JP 2007-098791 A 4/2007
JP 2007-101496 A 4/2007
JP 2007-101497 A 4/2007
JP 2007314596 A * 12/2007
JP 2009-117192 A 5/2009
JP 2013-010342 A 1/2013
JP 2015-013474 A 1/2015
JP 2015-116751 A 6/2015
JP 2015-178237 A 10/2015
JP 2016107593 A * 6/2016
JP 2018-041961 A 3/2018
JP 2019-025859 A 2/2019
JP 2019-119126 A 7/2019
JP 2020-059169 A 4/2020
JP 6721041 B2 7/2020
JP 2020-136600 A 8/2020
WO 2016/031746 A1 3/2016
WO 2017/098919 A1 6/2017
WO 2020/096410 A1 5/2020
WO 2021/065101 A1 4/2021

OTHER PUBLICATIONS

Japan Patent Office, International Search Report in International Patent Application No. PCT/JP2022/027751 (Aug. 30, 2022).
The International Bureau of WIPO, International Preliminary Report on Patentability in International Patent Application No. PCT/JP2022/027751 (Jan. 18, 2024).
Japan Patent Office, Office Action in Japanese Patent Application No. 2023-536718 (Apr. 14, 2026).

* cited by examiner

*Primary Examiner* — John D Freeman
(74) *Attorney, Agent, or Firm* — Leydig, Voit & Mayer, Ltd.

(57) ABSTRACT

Provided is a laminate that has excellent long-term heat resistance even when a metal substrate having a high surface roughness is used. A heat-resistant polymer film, an adhesive layer, and a metal substrate are layered in this order in the laminate. The laminate is characterized in that the adhesive layer is a silane coupling agent-derived adhesive layer and/or a silicone-derived adhesive layer, the adhesive strength F0 of the laminate prior to long-term heat resistance testing according to the 90 degree peel method is 0.05 N/cm to 20 N/cm inclusive, and the adhesive strength Ft of the laminate after long-term heat resistance testing according to the 90 degree peel method is larger than F0.

17 Claims, No Drawings

LAMINATE

TECHNICAL FIELD

The present invention relates to a laminate. More specifically, the present invention relates to a laminate in which a heat-resistant polymer film, an adhesive layer, and a metal base material are laminated in this order.

BACKGROUND ART

In recent years, for the purpose of decreasing the weight, size, and thickness of and imparting flexibility to functional elements such as semiconductor elements, MEMS elements, and display elements, technological development for forming these elements on polymer films has been actively carried out. In other words, as materials for substrates of electronic parts such as information and communication equipment (broadcasting equipment, mobile radio, portable communication equipment, and the like), radar, and high-speed information processing equipment, ceramics which exhibit heat resistance and can cope with increases in frequencies (reaching the GHz band) of the signal band of information and communication equipment have been conventionally used. However, ceramics are not flexible and are also hardly thinned and thus have a drawback that the applicable fields are limited, and polymer films have recently been used as substrates.

As a method for manufacturing a laminate in which a functional element is formed on the polymer film, (1) a method in which a metal layer is laminated on a resin film with an adhesive or a pressure sensitive adhesive interposed therebetween (Patent Documents 1 to 3), (2) a method in which a metal layer is placed on a resin film and then heat and pressure are applied for lamination (Patent Document 4), (3) a method in which a polymer film or metal layer is coated with a varnish for resin film formation, drying is performed, and then a metal layer or polymer film is laminated thereon, (4) a method in which a resin powder for resin film formation is disposed on a metal layer and compression molding is performed, (5) a method in which a conductive material is formed on a resin film by screen printing or sputtering (Patent Document 5), and the like are known. In a case where a multilayer laminate having three or more layers is manufactured, various combinations of the above-mentioned methods and the like are adopted.

Meanwhile, in the process of forming the laminate, the laminate is often exposed to high temperatures. For example, heating at about 450° C. may be required for dehydrogenation in the fabrication of low-temperature polysilicon thin film transistors, and a temperature of about 200° C. to 300° C. may be applied to the film in the fabrication of a hydrogenated amorphous silicon thin film. Hence, the polymer film composing the laminate is required to exhibit heat resistance, but as a practical matter, polymer films which can withstand practical use in such a high temperature region are limited. In addition, it is generally conceivable to use a pressure sensitive adhesive or an adhesive to bond a polymer film to a metal layer, but heat resistance is also required for the joint surface (namely, the adhesive or pressure sensitive adhesive for bonding) between the polymer film and the metal layer at that time. However, conventional adhesives and pressure sensitive adhesives for bonding do not exhibit sufficient heat resistance and cannot be applied since problems such as peeling off (that is, decreases in peel strength) of the polymer film, blistering, and carbide formation occur during the process or during actual use. In particular, in a case of being exposed to high temperatures for a long period of time or used at high temperatures for a long period of time, there is a problem that the peel strength decreases significantly and the laminate is unusable as a product.

In view of these circumstances, a laminate in which a polyimide film or a polyphenylene ether layer which exhibits excellent heat resistance, is tough, and can be thinned is bonded to an inorganic substance layer containing a metal with a silane coupling agent interposed therebetween has been proposed as a laminate of a polymer film and a metal layer (for example, see Patent Documents 6 to 9).

PRIOR ART DOCUMENT

Patent Documents

Patent Document 1: JP-A-2020-136600
Patent Document 2: JP-A-2007-101496
Patent Document 3: JP-A-2007-101497
Patent Document 4: JP-A-2009-117192
Patent Document 5: JP-A-11-121148
Patent Document 6: JP-A-2019-119126
Patent Document 7: JP-A-2020-59169
Patent Document 8: JP-B-6721041
Patent Document 9: JP-A-2015-13474

SUMMARY OF THE INVENTION

Problems to be Solved by the Invention

However, it has been found that since the silane coupling agent coating layer obtained by the methods disclosed in Patent Documents 6 to 8 is extremely thin, the close contact force (peel strength) that can withstand practical use is not exerted in a metal layer having an arithmetic surface roughness (Ra) of greater than 0.05 μm, and metal layers to which the silane coupling agent coating layer is applicable are limited to metal layers having a small surface roughness. In particular, it has been found that in a case where a polyimide film and a metal layer are laminated with a silane coupling agent interposed therebetween, the polymer does not soften or flow into the metal layer surface under usual heating and pressure pressing conditions, thus an anchor effect near the metal layer surface cannot be expected, and close contact force is not exerted.

In the method disclosed in Patent Document 9, polyphenylene ether is used as the heat-resistant polymer resin layer, but polyphenylene ether exhibits poor heat resistance (soldering heat resistance: 260° C. to 280° C. and long-term heat resistance) and cannot withstand practical use.

The present invention has been made in view of the above-mentioned problems, and an object thereof is to provide a laminate that exhibits excellent long-term heat resistance in a case where a metal base material having a large surface roughness is used as well.

Means for Solving the Problems

In other words, the present invention includes the following configurations.

[1] A laminate including a heat-resistant polymer film, an adhesive layer, and a metal base material laminated in this order, in which the adhesive layer is a silane coupling agent-derived adhesive layer and/or a silicone-derived adhesive layer, an adhesive strength F0 of the laminate before the following long-term heat resistance test by a 90-degree peel method is 0.05 N/cm or more and 20 N/cm or less, and an adhesive strength Ft of the laminate after the following long-term heat resistance test by a 90-degree peel method is greater than the F0:

[Long-Term Heat Resistance Test]

the laminate is left to still stand and stored at 350° C. for 500 hours in a nitrogen atmosphere.

[2] The laminate according to [1], in which the metal base material contains a 3d metal element.

[3] The laminate according to [1] or [2], in which the metal base material is one or more selected from the group consisting of SUS, copper, brass, iron, and nickel.

[4] The laminate according to any one of [1] to [3], in which a thickness of the adhesive layer is 0.01 times or more a surface roughness (Ra) of the metal base material.

[5] The laminate according to any one of [1] to [4], in which the heat-resistant polymer film is a polyimide film.

[6] A probe card including the laminate according to any one of [1] to [5] as a constituent component.

[7] A flat cable including the laminate according to any one of [1] to [5] as a constituent component.

[8] A heating unit including the laminate according to any one of [1] to [5] as a constituent component.

[9] An electrical or electronic substrate including the laminate according to any one of [1] to [5] as a constituent component.

[10] A solar cell including the laminate according to any one of [1] to [5] as a constituent component.

Effect of the Invention

According to the present invention, it is possible to provide a laminate that exhibits excellent long-term heat resistance in a case where a metal base material having a large surface roughness is used as well.

MODE FOR CARRYING OUT THE INVENTION

<Heat-Resistant Polymer Film>

Examples of the heat-resistant polymer film (hereinafter also referred to as polymer film) in the present invention include films of polyimide-based resins such as aromatic polyimides including polyimide, polyamideimide, polyetherimide, and fluorinated polyimide or alicyclic polyimide, polysulfone, polyethersulfone, polyetherketone, cellulose acetate, cellulose nitrate, and polyphenylene sulfide.

However, since the polymer film is premised on being used in a process involving heat treatment at 350° C. or more and after being heated to 350° C. or more, those that can actually be adopted among the exemplified polymer films are limited. Among the polymer films, a film obtained using a so-called super engineering plastic is preferable, and more specific examples include an aromatic polyimide film, an aromatic amide film, an aromatic amide-imide film, an aromatic benzoxazole film, an aromatic benzothiazole film, and an aromatic benzimidazole film.

The tensile modulus of the polymer film is preferably 2 GPa or more, more preferably 4 GPa or more, still more preferably 7 GPa or more at 25° C. from the viewpoint of suitably mounting functional elements. The tensile modulus of the polymer film at 25° C. can be set to, for example, 15 GPa or less or 10 GPa or less from the viewpoint of flexibility.

The details of the polyimide-based resin films (also referred to as polyimide films), which are an example of the polymer film, will be described below. Generally, a polyimide-based resin film is obtained by applying a polyamic acid (polyimide precursor) solution which is obtained by a reaction between a diamine and a tetracarboxylic acid in a solvent, to a support for polyimide film fabrication, drying the solution to form a green film (hereinafter, also called as a "polyamic acid film"), and treating the green film by heat at a high temperature to cause a dehydration ring-closure reaction on the support for polyimide film fabrication or in a state of being peeled off from the support.

For the application of the polyamic acid (polyimide precursor) solution, it is possible to appropriately use, for example, conventionally known solution application means such as spin coating, doctor blade, applicator, comma coater, screen printing method, slit coating, reverse coating, dip coating, curtain coating, and slit die coating.

The diamines constituting the polyamic acid are not particularly limited, and aromatic diamines, aliphatic diamines, alicyclic diamines and the like which are usually used for polyimide synthesis can be used. From the viewpoint of the heat resistance, aromatic diamines are preferable, and among the aromatic diamines, aromatic diamines having a benzoxazole structure are more preferable. When aromatic diamines having a benzoxazole structure are used, a high elastic modulus, low heat shrinkability, and a low coefficient of linear thermal expansion as well as the high heat resistance can be exerted. The diamines can be used singly or in combination of two or more kinds thereof.

The aromatic diamines having benzoxazole structures are not particularly limited, and examples thereof include: 5-amino-2-(p-aminophenyl)benzoxazole; 6-amino-2-(p-aminophenyl)benzoxazole; 5-amino-2-(m-aminophenyl) benzoxazole; 6-amino-2-(m-aminophenyl) benzoxazole; 2,2'-p-phenylenebis(5-aminobenzoxazole); 2,2'-p-phenylenebis(6-aminobenzoxazole); 1-(5-aminobenzoxazolo)-4-(6-aminobenzoxazolo)benzene; 2,6-(4,4'-diaminodiphenyl) benzo[1,2-d:5,4-d' ]bisoxazole; 2,6-(4,4'-diaminodiphenyl) benzo[1,2-d:4,5-d' ]bisoxazole; 2,6-(3,4'-diaminodiphenyl) benzo[1,2-d:5,4-d' ]bisoxazole; 2,6-(3,4'-diaminodiphenyl) benzo[1,2-d:4,5-d' ]bisoxazole; 2,6-(3,3'-diaminodiphenyl) benzo[1,2-d:5,4-d' ]bisoxazole; and 2,6-(3,3'-diaminodiphenyl)benzo[1,2-d:4,5-d' ]bisoxazole.

Examples of the aromatic diamines other than the above-described aromatic diamines having benzoxazole structures include: 2,2'-dimethyl-4,4'-diaminobiphenyl; 1,4-bis[2-(4-aminophenyl)-2-propyl]benzene(bisaniline); 1,4-bis(4-amino-2-trifluoromethylphenoxy)benzene; 2,2'-ditrifluoromethyl-4,4'-diaminobiphenyl; 4,4'-bis(4-aminophenoxy) biphenyl; 4,4'-bis(3-aminophenoxy) biphenyl; bis[4-(3-aminophenoxy)phenyl]ketone; bis[4-(3-aminophenoxy)phenyl] sulfide; bis[4-(3-aminophenoxy)phenyl]sulfone; 2,2-bis[4-(3-aminophenoxy)phenyl]propane; 2,2-bis[4-(3-aminophenoxy)phenyl]-1,1,1,3,3,3-hexafluoropropane; m-phenylenediamine; o-phenylenediamine; p-phenylenediamine; m-aminobenzylamine; p-aminobenzylamine; 3,3'-diaminodiphenylether; 3,4'-diaminodiphenylether; 4,4'-diaminodiphenylether; 3,3'-diaminodiphenylsulfide; 3,3'-diaminodiphenylsulfoxide; 3,4'-diaminodiphenylsulfoxide; 4,4'-diaminodiphenylsulfoxide; 3,3'-diaminodiphenylsulfone; 3,4'-diaminodiphenylsulfone; 4,4'-diaminodiphenylsulfone; 3,3'-diaminobenzophenone; 3,4'-diaminobenzophenone; 4,4'-diaminobenzophenone; 3,3'-diaminodiphenylmethane; 3,4'-diaminodiphenylmethane; 4,4'-diaminodiphenylmethane; bis[4-(4-aminophenoxy)phenyl]methane; 1,1-bis[4-(4-aminophenoxy)phenyl]ethane;

1,2-bis[4-(4-aminophenoxy)phenyl]ethane; 1,1-bis[4-(4-aminophenoxy)phenyl]propane; 1,2-bis[4-(4-aminophenoxy)phenyl]propane; 1,3-bis[4-(4-aminophenoxy)phenyl] propane; 2,2-bis[4-(4-aminophenoxy)phenyl]propane; 1,1-bis[4-(4-aminophenoxy)phenyl]butane; 1,3-bis[4-(4-aminophenoxy)phenyl]butane; 1,4-bis[4-(4-aminophenoxy) phenyl]butane; 2,2-bis[4-(4-aminophenoxy)phenyl]butane; 2,3-bis[4-(4-aminophenoxy)phenyl]butane; 2-[4-(4-aminophenoxy)phenyl]-2-[4-(4-aminophenoxy)-3-methylphenyl] propane; 2,2-bis[4-(4-aminophenoxy)-3-methylphenyl]propane; 2-[4-(4-aminophenoxy)phenyl]-2-[4-(4-aminophenoxy)-3,5-dimethylphenyl]propane; 2,2-bis[4-(4-aminophenoxy)-3,5-dimethylphenyl]propane; 2,2-bis[4-(4-aminophenoxy)phenyl]-1,1,1,3,3,3-hexafluoropropane; 1,4-bis(3-aminophenoxy)benzene; 1,3-bis(3-aminophenoxy) benzene; 1,4-bis(4-aminophenoxy)benzene; 4,4'-bis(4-aminophenoxy) biphenyl; bis[4-(4-aminophenoxy)phenyl] ketone; bis[4-(4-aminophenoxy)phenyl]sulfide; bis[4-(4-aminophenoxy)phenyl]sulfoxide; bis[4-(4-aminophenoxy) phenyl]sulfone; bis[4-(3-aminophenoxy)phenyl]ether; bis [4-(4-aminophenoxy)phenyl]ether; 1,3-bis[4-(4-aminophenoxy)benzoyl]benzene; 1,3-bis[4-(3-aminophenoxy) benzoyl]benzene; 1,4-bis[4-(3-aminophenoxy)benzoyl]benzene; 4,4'-bis[(3-aminophenoxy)benzoyl]benzene; 1,1-bis [4-(3-aminophenoxy)phenyl]propane; 1,3-bis[4-(3-aminophenoxy)phenyl]propane; 3,4'-diaminodiphenylsulfide; 2,2-bis[3-(3-aminophenoxy)phenyl]-1,1,1,3,3,3-hexafluoropropane; bis[4-(3-aminophenoxy)phenyl]methane; 1,1-bis[4-(3-aminophenoxy)phenyl]ethane; 1,2-bis[4-(3-aminophenoxy)phenyl]ethane; bis[4-(3-aminophenoxy) phenyl]sulfoxide; 4,4'-bis[3-(4-aminophenoxy)benzoyl] diphenylether; 4,4'-bis[3-(3-aminophenoxy)benzoyl] diphenylether; 4,4'-bis[4-(4-amino-α,α-dimethylbenzyl) phenoxy]benzophenone; 4,4'-bis[4-(4-amino-α,α-dimethylbenzyl)phenoxy]diphenylsulfone; bis[4-{4-(4-aminophenoxy)phenoxy}phenyl]sulfone; 1,4-bis[4-(4-aminophenoxy)phenoxy-α,α-dimethylbenzyl]benzene; 1,3-bis[4-(4-aminophenoxy)phenoxy-α,α-dimethylbenzyl] benzene; 1,3-bis[4-(4-amino-6-trifluoromethylphenoxy)-α,α-dimethylbenzyl]benzene; 1,3-bis[4-(4-amino-6-fluorophenoxy)-α,α-dimethylbenzyl]benzene; 1,3-bis[4-(4-amino-6-methylphenoxy)-α,α-dimethylbenzyl]benzene; 1,3-bis[4-(4-amino-6-cyanophenoxy)-α,α-dimethylbenzyl] benzene; 3,3'-diamino-4,4'-diphenoxybenzophenone; 4,4'-diamino-5,5'-diphenoxybenzophenone; 3,4'-diamino-4,5'-diphenoxybenzophenone; 3,3'-diamino-4-phenoxybenzophenone; 4,4'-diamino-5-phenoxybenzophenone, 3,4'-diamino-4-phenoxybenzophenone; 3,4'-diamino-5'-phenoxybenzophenone; 3,3'-diamino-4,4'-dibiphenoxybenzophenone; 4,4'-diamino-5,5'-dibiphenoxybenzophenone; 3,4'-diamino-4,5'-dibiphenoxybenzophenone; 3,3'-diamino-4-biphenoxybenzophenone; 4,4'-diamino-5-biphenoxybenzophenone; 3,4'-diamino-4-biphenoxybenzophenone; 3,4'-diamino-5'-biphenoxybenzophenone; 1,3-bis(3-amino-4-phenoxybenzoyl)benzene; 1,4-bis(3-amino-4-phenoxybenzoyl)benzene; 1,3-bis(4-amino-5-phenoxybenzoyl)benzene; 1,4-bis(4-amino-5-phenoxybenzoyl)benzene; 1,3-bis (3-amino-4-biphenoxybenzoyl)benzene, 1,4-bis(3-amino-4-biphenoxybenzoyl)benzene; 1,3-bis(4-amino-5-biphenoxybenzoyl)benzene; 1,4-bis(4-amino-5-biphenoxybenzoyl) benzene; 2,6-bis[4-(4-amino-α,α-dimethylbenzyl)phenoxy] benzonitrile; and aromatic diamines obtained by substituting a part or all of hydrogen atoms on an aromatic ring of the above-described aromatic diamines with halogen atoms; C1-3 alkyl groups or alkoxyl groups; cyano groups; or C1-3 halogenated alkyl groups or alkoxyl groups in which a part or all of hydrogen atoms of an alkyl group or alkoxyl group are substituted with halogen atoms.

Examples of the aliphatic diamines include: 1,2-diaminoethane; 1,4-diaminobutane; 1,5-diaminopentane; 1,6-diaminohexane; and 1,8-diaminooctane.

Examples of the alicyclic diamines include: 1,4-diaminocyclohexane and 4,4-methylenebis(2,6-dimethylcyclohexylamine).

The total amount of diamines (aliphatic diamines and alicyclic diamines) other than the aromatic diamines is preferably 20% by mass or less, more preferably 10% by mass or less, still more preferably 5% by mass or less of the total amount of all the diamines. In other words, the amount of aromatic diamines is preferably 80% by mass or more, more preferably 90% by mass or more, still more preferably 95% by mass or more of the total amount of all the diamines.

As tetracarboxylic acids constituting the polyamic acid, aromatic tetracarboxylic acids (including anhydrides thereof), aliphatic tetracarboxylic acids (including anhydrides thereof) and alicyclic tetracarboxylic acids (including anhydrides thereof), which are usually used for polyimide synthesis, can be used. Among these, aromatic tetracarboxylic anhydrides and alicyclic tetracarboxylic anhydrides are preferable, aromatic tetracarboxylic anhydrides are more preferable from the viewpoint of the heat resistance, and alicyclic tetracarboxylic acids are more preferable from the viewpoint of light transmittance. In a case where these are acid anhydrides, the acid anhydrides may have one anhydride structure or two anhydride structures in the molecule, but one (dianhydride) having two anhydride structures in the molecule is preferable. The tetracarboxylic acids may be used singly or in combination of two or more kinds thereof.

Examples of the alicyclic tetracarboxylic acids include: alicyclic tetracarboxylic acids such as cyclobutanetetracarboxylic acid; 1,2,4,5-cyclohexanetetracarboxylic acid; 3,3',4,4'-bicyclohexyltetracarboxylic acid; and anhydrides thereof. Among these, dianhydrides having two anhydride structures (for example, cyclobutanetetracarboxylic dianhydride, 1,2,4,5-cyclohexanetetracarboxylic dianhydride, 3,3',4,4'-bicyclohexyltetracarboxylic dianhydride and the like) are suitable. Incidentally, the alicyclic tetracarboxylic acids may be used singly or in combination of two or more kinds thereof.

For obtaining high transparency, the amount of the alicyclic tetracarboxylic acids is preferably 80% by mass or more, more preferably 90% by mass or more, still more preferably 95% by mass or more of, for example, the total amount of all the tetracarboxylic acids.

The aromatic tetracarboxylic acids are not particularly limited, but a pyromellitic acid residue (namely, one having a structure derived from pyromellitic acid) is preferable, and an anhydride thereof is more preferable. Examples of these aromatic tetracarboxylic acids include: pyromellitic dianhydride; 3,3',4,4'-biphenyltetracarboxylic dianhydride; 4,4'-oxydiphthalic dianhydride; 3,3',4,4'-benzophenonetetracarboxylic dianhydride; 3,3',4,4'-diphenylsulfonetetracarboxylic dianhydride; and 2,2-bis[4-(3,4-dicarboxyphenoxy)phenyl]propionic anhydride.

For obtaining high heat resistance, the amount of the aromatic tetracarboxylic acids is preferably 80% by mass or more, more preferably 90% by mass or more, still more preferably 95% by mass or more of, for example, the total amount of all the tetracarboxylic acids.

The thickness of the polymer film is preferably 3 μm or more, more preferably 11 μm or more, still more preferably 24 μm or more, yet still more preferably 45 μm or more. The upper limit of the thickness of the polymer film is not particularly limited but is preferably 250 μm or less, more preferably 150 μm or less, still more preferably 90 μm or less for use as a flexible electronic device.

The average CTE of the polymer film at between 30° C. and 500° C. is preferably −5 ppm/° C. to +20 ppm/° C., more preferably −5 ppm/° C. to +15 ppm/° C., still more preferably 1 ppm/° C. to +10 ppm/° C. When the CTE is in the above range, a small difference in coefficient of linear thermal expansion between the polymer film and a general support (inorganic substrate) can be maintained, and the polymer film and the inorganic substrate can be prevented from peeling off from each other when being subjected to a process of applying heat as well. Here, CTE is a factor that indicates reversible expansion and contraction with respect to temperature. The CTE of the polymer film refers to the average value of the CTE in the machine direction (MD direction) and the CTE in the transverse direction (TD direction) of the polymer film.

The heat shrinkage rate of the polymer film at between 30° C. and 500° C. is preferably ±0.9%, still more preferably ±0.6%. The heat shrinkage rate is a factor that represents irreversible expansion and contraction with respect to the temperature.

The tensile breaking strength of the polymer film is preferably 60 MPa or more, more preferably 120 MP or more, still more preferably 240 MPa or more. The upper limit of the tensile breaking strength is not particularly limited but is practically less than about 1000 MPa. The tensile breaking strength of the polymer film refers to the average value of the tensile breaking strength in the machine direction (MD direction) and the tensile breaking strength in the transverse direction (TD direction) of the polymer film.

The tensile breaking elongation of the polymer film is preferably 1% or more, more preferably 5% or more, still more preferably 20% or more. When the tensile breaking elongation is 1% or more, the handleability is excellent. The tensile breaking elongation of the polymer film refers to the average value of the tensile breaking elongation in the machine direction (MD direction) and the tensile breaking elongation in the transverse direction (TD direction) of the polymer film.

The thickness unevenness of the polymer film is preferably 20% or less, more preferably 12% or less, still more preferably 7% or less, particularly preferably 4% or less. When the thickness unevenness exceeds 208, it tends to be difficult to apply the film to narrow portions. The film thickness unevenness can be determined by, for example, randomly extracting about 10 positions from the film to be measured, measuring the film thickness using a contact-type film thickness meter, and calculating based on the following equation.

$$\text{Film thickness unevenness (\%)} = 100 \times (\text{maximum film thickness} - \text{minimum film thickness}) \div \text{average film thickness}$$

The polymer film is preferably one obtained in the form of being wound as a long polymer film having a width of 300 mm or more and a length of 10 m or more at the time of manufacture, more preferably one in the form of a roll-shaped polymer film wound around a winding core. When the polymer film is wound in a roll shape, it is easy to transport the polymer film in the form of a polymer film wound in a roll shape.

In order to secure handleability and productivity of the polymer film, a lubricant (particles) having a particle size of about 10 to 1000 nm is preferably added to/contained in the polymer film at about 0.03 to 3% by mass to impart fine unevenness to the surface of the polymer film and secure slipperiness.

The shape of the polymer film is preferably aligned to the shape of the laminate. Specifically, a rectangle, a square, or a circle may be mentioned, and a rectangle is preferred.

<Surface Activation Treatment of Polymer Film>

The polymer film may have been subjected to surface activation treatment. By subjecting the polymer film to surface activation treatment, the surface of the polymer film is modified to a state of having a functional group (so-called activated state), and the adhesive property to the inorganic substrate via the silane coupling agent is improved.

The surface activation treatment in the present specification is dry or wet surface treatment. Examples of the dry surface treatment include vacuum plasma treatment, normal pressure plasma treatment, treatment of irradiating the surface with active energy rays such as ultraviolet rays, electron beams, and X rays, corona treatment, flame treatment, and Itro treatment. Examples of the wet surface treatment include treatment of bringing the surface of the polymer film into contact with an acid or alkali solution.

A plurality of the surface activation treatments may be performed in combination. In the surface activation treatment, the surface of the polymer film is cleaned and an active functional group is produced. The produced functional group is bound to the silane coupling agent layer described later through hydrogen bonding, chemical reaction, and the like, and it is possible to firmly paste the polymer film to a silane coupling agent-derived adhesive layer and/or a silicone-derived adhesive layer.

<Adhesive Layer>

The adhesive layer is a layer formed of a silane coupling agent-derived adhesive layer and/or a silicone-derived adhesive layer. The adhesive layer may be a layer formed by coating the metal base material, or may be a layer formed by coating the polymer film. It is preferable to coat the metal base material since the surface of the metal base material having a large surface roughness can be easily flattened. Since the long-term heat resistance test is favorable, it is preferable that the adhesive layer is filled between the polymer film and the metal base material without any voids. The details of the method for forming the adhesive layer will be described in the section of the method for manufacturing a laminate.

The silane coupling agent contained in the silane coupling agent-derived adhesive layer is not particularly limited, but preferably contains a coupling agent having an amino group.

Preferred specific examples of the silane coupling agent include N-2-(aminoethyl)-3-aminopropylmethyldimethoxysilane, N-2-(aminoethyl)-3-aminopropyltrimethoxysilane, N-2-(aminoethyl)-3-aminopropyltriethoxysilane, 3-aminopropyltrimethoxysilane, 3-aminopropyltriethoxysilane, 3-triethoxysilyl-N-(1,3-dimethyl-butylidene) propylamine, N-phenyl-3-aminopropyltrimethoxysilane, N-(vinylbenzyl)-2-aminoethyl-3-aminopropyltrimethoxysilane hydrochloride, aminophenyltrimethoxysilane, aminophenethyltrimethoxysilane, and aminophenylaminomethylphenethyltrimethoxysilane. When particularly high heat resistance is required in the process, a silane coupling agent, in which an aromatic group links Si and an amino group to each other, is desirable.

The silicone-derived adhesive layer is not particularly limited, but preferably contains a silicone compound or silicone copolymer having an amino group. More preferred are silicone compounds or silicone copolymers having an addition-curable (addition reaction type) amino group. By using an addition reaction type, by-products are not produced during curing, and problems such as odor and corrosion are less likely to occur. It is also possible to suppress floating and generation of bubbles during heating at high temperatures.

Preferred specific examples of the silicone compound or silicone copolymer include KE-103 manufactured by Shin-Etsu Silicone.

It is also preferable that the silane coupling agent-derived adhesive layer and/or a silicone-derived adhesive layer are oligomers undergone hydrolysis to certain extents. As the adhesive layer has been hydrolyzed in advance before being applied to the metal base material and/or polymer film, it is possible to suppress the generation of water and alcohol by hydrolysis during laminate fabrication (heating). Thus, floating of the laminate can be suppressed.

The thickness of the adhesive layer is preferably 0.01 times or more the surface roughness (Ra) of the metal base material. The thickness is more preferably 0.05 times or more, still more preferably 0.1 times or more, particularly preferably 0.2 times or more since the irregularities of the surface of the metal base material are filled and a flat surface can be easily formed. The upper limit is not particularly limited, but is preferably 1000 times or less, more preferably 600 times or less, still more preferably 400 times or less since the initial adhesive strength F0 becomes favorable. By setting the thickness to be in the above range, a laminate exhibiting excellent long-term heat resistance can be fabricated. In particular, if the heat-resistant polymer film to be bonded is rigid and is not deformed by irregularities of the surface of the base material, it is preferable that the adhesive layer is thick and the adhesive surface is as flat as possible. The method for measuring the thickness of the adhesive layer is as described in Examples. In a case where the thickness of the adhesive layer is not uniform, the thickness of the thickest part of the adhesive layer is taken as the thickness.

The relation between the thickness of the adhesive layer and the surface roughness (Ra) of the metal base material is preferably in the above range, and specifically, the thickness of the adhesive layer is preferably 0.01 μm or more, more preferably 0.02 μm or more, still more preferably 0.05 μm or more. The thickness of the adhesive layer is preferably 20 μm or less, more preferably 15 μm or less, still more preferably 10 μm or less.

<Metal Base Material>

The metal base material preferably contains a 3d metal element (3d transition element). Specific examples of 3d metal elements include scandium (Sc), titanium (Ti), vanadium (V), chromium (Cr), manganese (Mn), iron (Fe), cobalt (Co), nickel (Ni), or copper (Cu), and the metal base material may be a single element metal using these metals singly or may be an alloy containing two or more kinds thereof. The metal base material is preferably in the form of a plate or metal foil that can be used as a substrate formed of the metal. Specifically, the metal base material is preferably SUS, copper, brass, iron, nickel, Inconel, SK steel, nickel-plated iron, nickel-plated copper, or Monel. More specifically, the metal base material is preferably one or more metal foils selected from the group consisting of SUS, copper, brass, iron, and nickel.

The metal base material may be an alloy containing tungsten (W), molybdenum (Mo), platinum (Pt), or gold (Au) in addition to the 3d metal elements. In the case where a metal element other than a 3d metal element is contained, the 3d element metal is contained at preferably 50% by mass or more, more preferably 80% by mass or more, still more preferably 90% by mass or more, particularly preferably 99% by mass or more.

The laminate of the present invention exhibits excellent long-term heat resistance in a case where a metal base material having a large surface roughness is used as well. Hence, the surface roughness (arithmetic mean roughness Ra) of the metal base material is preferably 0.05 μm or more, more preferably more than 0.05 μm, still more preferably 0.07 μm or more, yet still more preferably 0.1 μm or more, particularly preferably 0.5 μm or more. The upper limit is preferably 5 μm or less, more preferably 4 μm or less, still more preferably 3 μm or less.

The thickness of the metal base material is not particularly limited, and is preferably 0.001 mm or more, more preferably 0.01 mm or more, still more preferably 0.1 mm or more. The thickness of the metal base material is preferably 2 mm or less, more preferably 1 mm or less, still more preferably 0.5 mm or less. By setting the thickness of the metal base material to be in the above range, it is easy to use the laminate roll in uses such as a probe card to be described later.

<Laminate>

The laminate of the present invention is a laminate in which the heat-resistant polymer film, the adhesive layer, and the metal base material are laminated in this order. It is preferable that the adhesive strength F0 of the laminate before the following long-term heat resistance test by a 90-degree peel method is 0.05 N/cm or more and 20 N/cm or less and the adhesive strength Ft of the laminate after the following long-term heat resistance test by a 90-degree peel method is greater than the F0.

[Long-Term Heat Resistance Test]

the laminate is left to still stand and stored at 350° C. for 500 hours in a nitrogen atmosphere.

The adhesive strength F0 is required to be 0.05 N/cm or more. The adhesive strength F0 is more preferably 0.1 N/cm or more, still more preferably 0.5 N/cm or more, particularly preferably 1 N/cm or more since it is easier to prevent accidents such as peeling off and misregistration of the polymer film during device fabrication (mounting process). The adhesive strength F0 is required to be 20N/cm or less. The adhesive strength F0 is more preferably 15 N/cm or less, still more preferably 10 N/cm or less, particularly preferably 5 N/cm or less since it is easier to peel off the polymer film from the metal base material after device fabrication.

The adhesive strength Ft is required to be greater than the F0. The rate of increase in adhesive strength ((Ft/F0)/F0×100(%)) is preferably 1% or more, more preferably 5% or more, still more preferably 10% or more, particularly preferably 50% or more since the adhesive strength of the laminate is maintained after a long-term heat resistance test as well, it is easy to fabricate a device, and it is easier to prevent troubles such as peeling off and blistering during long-term use. The rate of increase in adhesive strength is preferably 500% or less, more preferably 400% or less, still more preferably 300% or less, particularly preferably 200% or less.

The adhesive strength Ft is not particularly limited as long as it satisfies the rate of increase in adhesive strength, but is preferably 0.1 N/cm or more. The adhesive strength Ft is more preferably 0.5 N/cm or more, still more preferably 1 N/cm or more, particularly preferably 2 N/cm or more since it is easier to prevent the accident of peeling off of the polymer film during device fabrication. The adhesive strength Ft is preferably 30 N/cm or less. The adhesive strength Ft is more preferably 20 N/cm or less, still more preferably 15 N/cm or less, particularly preferably 10 N/cm or less since it is easier to peel off the polymer film from the metal base material after device fabrication.

In other words, in the present invention, by setting the adhesive strength before and after the long-term heat resistance test to be in the above ranges, it is possible to prevent the accident of peeling off during the processing process and actual use. The method for achieving the adhesive strength is not particularly limited, and examples thereof include setting the ratio of the adhesive layer to the surface roughness Ra of the metal base material to be in a predetermined range, and setting the thickness of the adhesive layer to be in a predetermined range.

The laminate of the present invention can be fabricated, for example, according to the following procedure. A laminate can be obtained by treating at least one surface of the metal base material with a silane coupling agent in advance, superimposing the surface treated with a silane coupling agent on the polymer film, and pressurizing the two for lamination. A laminate can also be obtained by treating at least one surface of the polymer film with a silane coupling agent in advance, superimposing the surface treated with a silane coupling agent on the metal base material, and pressurizing the two for lamination. When a silane coupling agent is applied, it is also possible to perform bonding while an aqueous medium such as water is supplied (hereinafter also referred to as water bonding). By adopting water bonding, trace amounts of impurities and excess silane coupling agent on the surface of the base material can be removed. Examples of the silane coupling agent treatment method include a method in which the silane coupling agent is vaporized and a gaseous silane coupling agent is applied (gaseous phase coating method) or a spin coating method and a hand coating method in which the silane coupling agent is applied as an undiluted solution or after being dissolved in a solvent. Among these, the gaseous phase coating method is preferred. Examples of the pressurization method include ordinary pressing or lamination in the air, or pressing or lamination in a vacuum. In order to acquire stable adhesive strength over the entire surface, lamination in the air is preferred for laminates having a large size (for example, more than 200 mm). In contrast, pressing in a vacuum is preferable in the case of a laminate having a small size of about 200 mm or less. As the degree of vacuum, a degree of vacuum obtained by an ordinary oil-sealed rotary pump is sufficient, and about 10 Torr or less is sufficient. The pressure is preferably 1 MPa to 20 MPa, more preferably 3 MPa to 10 MPa. The base material may be destroyed when the pressure is high, and adhesion may not be achieved at some portions when the pressure is low. The temperature is preferably 90° C. to 300° C., more preferably 100° C. to 250° C. The polymer film may be damaged when the temperature is high, and adhesive force may be weak when the temperature is low.

As the shape of the laminate, a rectangle, a square, or a circle may be mentioned, and a rectangle is preferred. The area of the laminate is preferably 0.01 square meters or more, more preferably 0.1 square meters or more, still more preferably 0.7 square meters or more, particularly preferably 1 square meter or more. The area of the laminate is preferably 5 square meters or less, more preferably 4 square meters or less from the viewpoint of ease of fabrication. In a case where the shape of the laminate is rectangular, the length of one side is preferably 50 mm or more, more preferably 100 mm or more. The upper limit is not particularly limited, but is preferably 1000 mm or less, more preferably 900 mm or less.

The laminate of the present invention can be used as a constituent component of a probe card, a flat cable, a heating unit (insulated type heater), an electrical or electronic substrate, or a solar cell (back sheet for solar cell). By using the laminate of the present invention in the above-mentioned uses, it is possible to ease the processing conditions (expand the process window) and increase the service life.

EXAMPLES

<Preparation of Polyamic Acid Solution A>

The inside of a reaction vessel equipped with a nitrogen introducing tube, a thermometer, and a stirring bar was purged with nitrogen, then 223 parts by mass of 5-amino-2-(p-aminophenyl)benzoxazole (DAMBO) and 4416 parts by mass of N, N-dimethylacetamide were added and completely dissolved, subsequently 217 parts by mass of pyromellitic dianhydride (PMDA) and a dispersion obtained by dispersing colloidal silica as a lubricant in dimethylacetamide ("SNOWTEX (registered trademark) DMAC-ST30" manufactured by Nissan Chemical Corporation) were added so that silica (lubricant) was 0.12% by mass of the total amount of polymer solids in the polyamic acid solution, and the mixture was stirred at a reaction temperature of 25° C. for 24 hours to obtain a brown and viscous polyamic acid solution A.

<Preparation of Polyamic Acid Solution B>

The inside of a reaction vessel equipped with a nitrogen introducing tube, a thermometer, and a stirring bar was substituted with nitrogen, and then 398 parts by mass of 3,3',4,4'-biphenyltetracarboxylic dianhydride (BPDA) and 4600 parts by mass of N, N-dimethylacetamide were added into the reaction vessel and thoroughly stirred so as to be uniform. Next, SNOWTEX (DMAC-ST30, manufactured by Nissan Chemical Corporation) in which colloidal silica (average particle size: 0.08 μm) was dispersed in dimethylacetamide was added to together with 147 parts by mass of paraphenylenediamine (PDA) so that colloidal silica was 0.7% by mass of the total amount of polymer solids in the polyamic acid solution B, and the mixture was stirred at a reaction temperature of 25° C. for 24 hours to obtain a brown and viscous polyamic acid solution B.

<Preparation of Polyamic Acid Solution C>

The inside of a reaction vessel equipped with a nitrogen introducing tube, a thermometer, and a stirring bar was substituted with nitrogen, and then pyromellitic anhydride (PMDA) and 4,4'diaminodiphenyl ether (ODA) were added into the reaction vessel in equivalent amounts and dissolved in N, N-dimethylacetamide, SNOWTEX (DMAC-ST30 manufactured by Nissan Chemical Corporation) in which colloidal silica (average particle size: 0.08 μm) was dispersed in dimethylacetamide was added so that colloidal silica was 0.7% by mass of the total amount of polymer solids in the polyamic acid solution C, and the mixture was stirred at a reaction temperature of 25° C. for 24 hours to obtain a brown and viscous polyamic acid solution C.

<Preparation of Polyamic Acid Solution D>

The inside of a reaction vessel equipped with a nitrogen introducing tube, a reflux tube, and a stirring bar was purged with nitrogen, then 56.4 parts by mass of 2,2'-ditrifluoromethyl-4,4'-diaminobiphenyl (TFMB) and 900 parts by mass of N, N-dimethylacetamide (DMAc) were added and dissolved completely, subsequently, a dispersion obtained by dispersing colloidal silica as a lubricant in dimethylacetamide ("SNOWTEX (registered trademark) DMAC-ST30" manufactured by Nissan Chemical Corporation) was added together with 17.3 parts by mass of 1,2,3,4-cyclobutanetetracarboxylic dianhydride (CBDA), 18.1 parts by mass of 3,3',4,4'-biphenyltetracarboxylic dianhydride (BPDA), and 8.2 parts by mass of 4,4'-oxydiphthalic dianhydride (ODPA) so that silica (lubricant) was 0.12% by mass of the total amount of polymer solids in the polyamic acid solution, and the mixture was stirred at a reaction temperature of 25° C. for 24 hours to obtain a transparent yellow and viscous polyamic acid solution D.

<Preparation of Aromatic Polyamide Solution E>

The inside of a reaction vessel equipped with a nitrogen introducing tube, a reflux tube, and a stirring bar was purged with nitrogen, then 567 parts by mass of dry N-methylpyrrolidone (NMP) was added, 271 parts by mass of paraphenylenediamine (PDA) and 129 parts by mass of 1,3-bis(3-aminophenoxy)benzene were dissolved in this while stirring was performed, and the solution was cooled to 5° C. Next, 3 parts by mass of pyromellitic dianhydride was added, and the reaction was conducted for about 15 minutes. Thereto, 57 parts by mass of 2-chloroterephthalic acid chloride was added over 20 minutes. Since the viscosity increased after 15 minutes, dilution with NMP was performed, and stirring was continuously performed for 45 minutes. Thereafter, propylene oxide was added in an equimolar amount to that of the generated hydrogen chloride, and neutralization was performed at 30° C. over 1 hour. The concentration of the obtained aromatic polyamic acid solution E was 10% by mass.

<Preparation of Polybenzoxazole (PBO) Solution F>

Per batch, 194 parts by mass of diphosphorus pentoxide was added to 588 parts by mass of 116% polyphosphoric acid in a nitrogen stream, then 122 parts by mass of 4,6-diaminoresorcinol dihydrochloride, 95 parts by mass of terephthalic acid finely powdered to have an average particle size of 2 μm, and 0.6 parts by mass of monodispersed spherical silica fine particles having an average particle size of 200 nm (manufactured by Nippon Shokubai Co., Ltd.) were added, and the mixture was stirred and mixed in a tank reactor at 80° C. After heating and mixing was further performed at 150° C. for 10 hours, polymerization was performed using a twin-screw extruder heated to 200° C., and filtration through a filter having a nominal opening of 30 μm was performed to obtain a PBO solution F. The color of the PBO solution F was yellow.

Polyimide Film Fabrication Example 1

The polyamic acid solution A obtained above was applied to the smooth surface (lubricant-free surface) of a long polyester film ("A-4100" manufactured by TOYOBO CO., LTD.) having a width of 1050 mm using a slit die so that the final film thickness (film thickness after imidization) was 15 μm, dried at 105° C. for 20 minutes, and then peeled off from the polyester film to obtain a self-supporting polyamic acid film having a width of 920 mm.

The polyamic acid film obtained above was obtained, and then subjected to a heat treatment at 150° C. for 5 minutes in the first stage, 220° C. for 5 minutes in the second stage, and 495° C. for 10 minutes in the third stage using a pin tenter for imidization, and the pin grips at both edges were removed by slitting to obtain a long polyimide film (PI-1) (1000 m roll) having a width of 850 mm.

The polyamic acid solution B was also subjected to the same operation as above to fabricate a polyimide film (PI-2).

Polyimide Film Fabrication Example 2

The polyamic acid solution C obtained above was applied to the smooth surface (lubricant-free surface) of a long polyester film ("A-4100" manufactured by TOYOBO CO., LTD.) having a width of 210 mm and a length of 300 mm using a slit die so that the final film thickness (film thickness after imidization) was 15 μm, dried at 105° C. for 20 minutes, and then peeled off from the polyester film to obtain a self-supporting polyamic acid film having a width of 100 mm and a length of 250 mm.

The polyamic acid film obtained above was fixed to a rectangular metal frame having an outer diameter of 150 mm in width and 220 mm in length and an inner diameter of 130 mm in width and 200 mm in length with metal clips, and subjected to a heat treatment at 150° C. for 5 minutes, at 220° C. for 5 minutes, and at 450° C. for 10 minutes for imidization, and the metal frame grips were cut with a cutter to obtain a polyimide film (PI-3) having a width of 130 mm and a length of 200 mm.

The polyamic acid solution D was also subjected to the same operation as above to a fabricate polyimide film (PI-4).

Fabrication Example of Aromatic Polyamide Film and PBO Film

The aromatic polyamide solution E obtained above was filtered through a filter having a nominal opening of 20 μm and then extruded from a T-die at 150° C., the extruded highly viscous film dope was cast onto a metal roll in a clean room in a nitrogen atmosphere and cooled, and both surfaces of the film-shaped dope were laminated with a separately prepared unstretched polyethylene terephthalate film. The entire laminate of the dope and unstretched polyethylene terephthalate films was stretched 3-fold in the transverse direction at 100° C. using a tenter, and then the laminated polyethylene terephthalate films were peeled off and removed. The obtained film-shaped dope was washed with water and solidified in constant length and width while both edges were gripped, and then heat-set at 280° C. while both edges were gripped using a tenter to obtain a biaxially oriented aromatic polyamide film (PA-5) having a thickness of 3 μm. The obtained film exhibited favorable surface smoothness as well as favorable slipperiness and scratch resistance.

The PBO solution F was also subjected to the same operation as above to fabricate a PBO film (PBO-6).

As the metal base material, SUS304 (manufactured by KENIS LIMITED), copper plate (manufactured by KENIS LIMITED), rolled copper foil (manufactured by MITSUI SUMITOMO METAL MINING BRASS & COPPER CO., LTD.), electrolytic copper foil (manufactured by The Furukawa Electric Co., Ltd.), SK steel (manufactured by KENIS LIMITED), nickel-plated iron (manufactured by KENIS LIMITED), nickel-plated copper (manufactured by KENIS LIMITED), aluminum plate (manufactured by KENIS LIMITED), Inconel foil (manufactured by AS ONE Corporation), iron plate (manufactured by AS ONE Corporation), brass plate (manufactured by AS ONE Corporation), and Monel plate (manufactured by AS ONE Corporation) were used.

Hereinafter, the metal base material is also simply referred to as a base material or a substrate.

<Cleaning of Metal Base Material>

The surface of the metal base material on which a silane coupling agent layer was to be formed was degreased with acetone, ultrasonically cleaned in pure water, and irradiated with UV/ozone for 3 minutes in order.

<Formation of Silane Coupling Agent Layer on Base Material>

A silane coupling agent layer (adhesive layer) was formed on the substrate as a base material by the following method. The method for forming the silane coupling agent layer is not particularly limited, but is preferably a gaseous phase coating method.

Coating Example 1 (Gaseous Phase Coating Method)

A suction bottle filled with 100 parts by mass of a silane coupling agent was connected to a chamber equipped with an exhaust duct, a substrate cooling stage, and a silane coupling agent spray nozzle via a silicone tube, and then the suction bottle was left to still stand in a water bath at 40° C. By sealing the suction bottle in a state where instrumentation air could be introduced from above, a state was created in which the vapor of silane coupling agent could be introduced into the chamber. Next, the substrate cooling stage in the chamber was cooled to 10° C. to 20° C., the substrate was placed horizontally on the substrate cooling stage with the UV irradiated surface facing up, and the chamber was closed. Next, instrumentation air was introduced at 20 L/min, and the inorganic substrate was exposed to silane coupling agent vapor by maintaining a state where the inside of the chamber was filled with silane coupling agent vapor for 20 minutes, thereby obtaining a silane coupling agent-coated substrate.

Coating Example 2 (Spin Coating Method)

A diluted silane coupling agent solution was prepared by diluting the silane coupling agent with isopropanol to a content of 10% by mass. The substrate was installed in a spin coater (MSC-500S manufactured by JAPAN CREATE Co., Ltd.), the rotation speed was increased up to 2000 rpm, and rotation was performed for 10 seconds to apply the diluted silane coupling agent solution. Next, the substrate coated with a silane coupling agent was placed on a hot plate heated at 110° C. with the silane coupling agent-coated surface facing up, and heating was performed for about 1 minute to obtain a silane coupling agent-coated substrate.

Coating Example 3 (Hand Coating Method)

A base material was placed on a smooth glass plate, one edge of the base material was fixed with mending tape, and a silane coupling agent was dropped. Thereafter, the base material surface was coated with the silane coupling agent using a bar coater (#3) to obtain a silane coupling agent-coated substrate.

<Laminate Fabrication Method 1: Water Bonding (Water Bonding Lamination)>

Immediately after 3 ml of pure water per 100 $cm^2$ area was dropped onto the substrate (metal base material or polymer film) on which a silane coupling agent layer was formed, a substrate (polymer film or metal base material) different from the substrate was stacked and then laminated using a laminating machine (manufactured by MCK CO., LTD.) while water between the silane coupling agent layer and the polymer film was removed, thereby fabricating a laminate. Next, the laminate was left to still stand overnight in an environment having a temperature of 24° C. and a humidity of 50% RH. Thereafter, a heat treatment was performed at 110° C. for 10 minutes and 200° C. for 60 minutes in an air atmosphere, and a 90° peel test (F0) was conducted. Furthermore, a heat treatment was performed on a separately prepared laminate after the heat treatment at 350° C. for 500 hours in a nitrogen atmosphere, and a 90° peel test (Ft) was conducted. The evaluation results are presented in Tables 1 to 5.

<Laminate Fabrication Method 2: Lamination>

A substrate (polymer film or metal base material) was stacked on another substrate (metal base material or polymer film) on which a silane coupling agent layer was formed, and then laminated using a laminating machine (manufactured by MCK CO., LTD.) while air between the silane coupling agent layer and the polymer film was removed, thereby fabricating a laminate. Water including pure water was not used. Next, the laminate was left to still stand overnight in an environment having a temperature of 24° C. and a humidity of 50% RH. Thereafter, a heat treatment was performed at 110° C. for 10 minutes and 200° C. for 60 minutes in an air atmosphere, and a 90° peel test (F0) was conducted. Furthermore, a heat treatment was performed on a separately prepared laminate after the heat treatment at 350° C. for 500 hours in a nitrogen atmosphere, and a 90° peel test (Ft) was conducted. The evaluation results are presented in Tables 1 to 5.

<Laminate Fabrication Method 3: Pressing>

A substrate (polymer film or metal base material) was stacked on another substrate (metal base material or polymer film) on which a silane coupling agent layer was formed, and then pressed using a pressing machine (manufactured by Imoto machinery Co., LTD.). The pressing conditions were set to 1 MPa and 5 minutes. Thereafter, a heat treatment was performed at 110° C. for 10 minutes and 200° C. for 60 minutes in an air atmosphere, and a 90° peel test (F0) was conducted. Furthermore, a heat treatment was performed on a separately prepared laminate after the heat treatment at 350° C. for 500 hours in a nitrogen atmosphere, and a 90° peel test (Ft) was conducted. The evaluation results are presented in Tables 1 to 5.

The silane coupling agent and adhesive used in the adhesive layer of the present invention are as follows.

Silane coupling agent 1: KBE-903 manufactured by Shin-Etsu Chemical Co., Ltd. (3-aminopropyltriethoxysilane)

Silane coupling agent 2: X-12-972F manufactured by Shin-Etsu Silicone (polymer type of polyvalent amine type silane coupling agent)

Silane coupling agent 3: KBMY-602 manufactured by Shin-Etsu Silicone (N-2-(aminoethyl)-3-aminopropylmethyldimethoxysilane)

Silane coupling agent 4: KBM573 manufactured by Shin-Etsu Silicone (N-phenyl-3-aminopropyltrimethoxysilane)

Silicone-based adhesive 1: KE-103 manufactured by Shin-Etsu Silicone (two-component liquid silicone rubber)

Silicone-based adhesive 2: Hardener CAT-103 manufactured by Shin-Etsu Chemical Co., Ltd.

Epoxy adhesive: TB1222C manufactured by ThreeBond Co., Ltd.

Acrylic adhesive: S-1511x manufactured by Toagosei Co., Ltd.

Urethane-based adhesive: POLYNATE955H manufactured by TOYOPOLYMER CO., LTD.

Fluorine-based adhesive: X-71-8094-5A/B manufactured by Shin-Etsu Chemical Co., Ltd.

It is preferable that the pure water is equivalent to or higher than GRADE1 according to the standards set forth by ISO3696-1987. The pure water is more preferably of GRADE3. The pure water used in the present invention was of GRADE1.

<90° Peel Test (90° Peel Method)>

A 90° peel test was conducted using JSV-H1000 (manufactured by Japan Instrumentation System Co., Ltd.). The polymer film was peeled off from the base material at an angle of 90°, and the test (peeling) speed was 100 mm/min. The size of the measurement sample was 10 mm in width and 50 mm in length. The measurement was performed in an air atmosphere at room temperature (25° C.). The measurement was performed five times, and the average value of the peel strengths in five times of test was used as the measurement result. The initial adhesive strength F0 (before a long-term heat resistance test) was evaluated according to the following index. The adhesive strength is required to be 0.05 N/cm or more, and is desirably 1 N/cm or more. The adhesive strength is still more preferably 2 N/cm or more. The upper limit is required to be 20 N/cm or less, and is more preferably 15 N/cm or less, still more preferably 10 N/cm or less, particularly preferably 5 N/cm or less since it is easier to peel off the polymer film from the metal base material after device fabrication.

Excellent: 2 N/cm or more and 20 N/cm or less

Favorable: 1 N/cm or more and less than 2 N/cm

Acceptable: 0.05 N/cm or more and less than 1 N/cm

Poor: Less than 0.05 N/cm or more than 20 N/cm

<Long-Term Heat Resistance Test>

The sample (laminate) was stored for 500 hours in a state of being heated at 350° C. in a nitrogen atmosphere. A high-temperature inert gas oven INH-9N1 (manufactured by JTEKT THERMO SYSTEMS CORPORATION) was used for the heat treatment. The following rate of increase in close contact force (adhesive force) was used as the criterion.

<Rate of Increase in Close Contact Force>

Before a long-term heat resistance test, the 90° peel test was performed, and the measurement result of peel strength was taken as the initial adhesive strength F0. Next, a long-term heat resistance test was conducted, and the sample (laminate) after the test was subjected to a 90° peel test, and the measurement result of peel strength was taken as the adhesive strength Ft. The rate of increase in close contact force after the test was calculated by the following equation.

$$(\text{Rate of increase in close contact force } (\%)) = (Ft - F0)/F0 \times 100$$

The rate of increase in close contact force was evaluated according to the following index.

Excellent: 100% or more and 300% or less

Favorable: 5% or more and less than 100%

Acceptable: More than 0% and less than 5%, or more than 300%

Poor: 0% or less, or occurrence of melting or peeling off during test

<Optimum Ranges of Close Contact Force Before and After Long-Term Heat Resistance Test and Rate of Increase in Close Contact Force>

The laminate was evaluated (comprehensive evaluation) from the initial adhesive strength F0 (before a long-term heat resistance test) and the rate of increase in close contact force according to the following index.

Excellent: Both initial adhesive strength F0 and rate of increase in close contact force are evaluated as Excellent.

Favorable: Both initial adhesive strength F0 and rate of increase in close contact force are evaluated as Favorable or higher (excluding case of Excellent above).

Acceptable: Both initial adhesive strength F0 and rate of increase in close contact force are evaluated as Acceptable or higher (excluding cases of Excellent and Favorable above).

Poor: Either of initial adhesive strength F0 or rate of increase in close contact force is evaluated as Poor.

Remarkably poor: Both initial adhesive strength F0 and rate of increase in close contact force are evaluated as Poor.

Extremely Poor: Peeling off has occurred before long-term heat resistance test.

<Adhesive Layer Thickness Evaluation>

The substrate on which a silane coupling agent layer was formed was cut into a piece having a width of 35 mm and a length of 35 mm. Next, the cut substrate was immersed in warm water at 40° C. to dissolve the silane coupling agent layer in the water. Next, the water in which the silane coupling agent was dissolved was collected, and the amount of Si was analyzed using an ICP atomic emission spectrometer. The amount of Si was regarded as the amount of silane coupling agent, and was taken as the average thickness per unit area.

Regarding the adhesive layer other than the silane coupling agent, a cross-sectional thin film sample was fabricated using a focused ion beam (FIB) instrument, and the thickness was determined through observation under a transmission electron microscope (TEM) (manufactured by JEOL Ltd.).

<Evaluation of Base Material Surface Roughness>

The surface roughness (arithmetic mean roughness Ra) of the base material was measured using a laser microscope (product name: OPTELICS HYBRID manufactured by KEYENCE CORPORATION). The measurement was performed under the following conditions, and the surface roughness of the base material was measured using the center of the base material of 100 mm square or more as an observation region and the center of the observation region as an evaluation region. The evaluation was performed in one observation region for one sample.

Observation region: 300 μm×300 μm

Evaluation region: 150 μm×150 μm

Observation magnification: 50-fold

Example 1

A silane coupling agent layer was formed using the SUS304 (base material thickness: 0.5 mm) as a base material by the method of coating example 1, and a laminate was fabricated using polyimide film Xenomax (registered trademark) (manufactured by TOYOBO CO., LTD.) as a heat-resistant polymer film by the method of laminate fabrication example 1. The evaluation results are presented in Table 1.

Examples 2 to 33 and Comparative Examples 1 to 9

Examples 2 to 33 and Comparative Examples 1 to 9 were carried out under the conditions listed in Tables 1 to 5. The adhesive layer was formed on the base material in Examples 1 to 30 and 32 and Comparative Examples 1 to 8, and the adhesive layer was formed on the heat-resistant polymer film in Examples 31 and 33 and Comparative Example 9.

The following polymer films were also used as the heat-resistant polymer film.

UPILEX (registered trademark): Polyimide film manufactured by UBE Corporation

Kapton (registered trademark): Polyimide film manufactured by DU PONT-TORAY CO., LTD.

Polyester film: A-4100 manufactured by TOYOBO CO., LTD.

Polyamide film: Manufactured by TOYOBO CO., LTD.

Example 34

To 20 parts by mass of KBM-903, 6 parts by mass of pure water was added, and the mixture was stirred at room temperature (25° C.) for 3 hours. After that, the alcohol produced was removed from the stirred liquid over 1 hour using an evaporator equipped with a water bath at 30° C. to obtain a solution containing an oligomer of silane coupling agent. Next, the same operation as in Example 1 was performed (however, the coating method was changed to a hand coating method) to fabricate a laminate. The evaluation results are presented in Table 4.

TABLE 1

| | | Example 1 | Example 2 | Example 3 | Example 4 | Example 5 | Example 6 | Example 7 | Example 8 | Example 9 | Comparative Example 1 | Comparative Example 2 |
|---|---|---|---|---|---|---|---|---|---|---|---|---|
| Heat-resistant polymer film | Kind | XENOMAX | PI-1 | PI-2 | PI-3 | PI-4 | PA-5 | PBO-6 | UPILEX | Kapton | Polyester | Polyamide |
| | Thickness (μm) | 15 | 15 | 15 | 15 | 15 | 15 | 15 | 3 | 3 | 90 | 70 |
| Adhesive layer | Kind | KBM903 | KBM903 | KBM903 | KBM903 | KBM903 | KBM903 | KBM903 | KBM903 | KBM903 | KBM903 | KBM903 |
| | Coating method | coating method Gaseous phase | coating method Gaseous phase | coating method Gaseous phase | coating method Gaseous phase | coating method Gaseous phase | coating method Gaseous phase | coating method Gaseous phase | coating method Gaseous phase | coating method Gaseous phase | coating method Gaseous phase | coating method Gaseous phase |
| | Formed material | Metal base material | Metal base material | Metal base material | Metal base material | Metal base material | Metal base material | Metal base material | Metal base material | Metal base material | Metal base material | Metal base material |
| | Thickness (μm) | 0.02 | 0.02 | 0.02 | 0.02 | 0.02 | 0.02 | 0.02 | 0.02 | 0.02 | 0.02 | 0.02 |
| Metal base material | Kind | SUS304 | SUS304 | SUS304 | SUS304 | SUS304 | SUS304 | SUS304 | SUS304 | SUS304 | SUS304 | SUS304 |
| | Thickness (mm) | 0.5 | 0.5 | 0.5 | 0.5 | 0.5 | 0.5 | 0.5 | 0.5 | 0.5 | 0.5 | 0.5 |
| | Surface roughness Ra (μm) | 0.05 | 0.05 | 0.05 | 0.05 | 0.05 | 0.05 | 0.05 | 0.05 | 0.05 | 0.05 | 0.05 |
| | Thickness of adhesive layer/surface roughness Ra of metal base material | 0.40 | 0.40 | 0.40 | 0.40 | 0.40 | 0.40 | 0.40 | 0.40 | 0.40 | 0.40 | 0.40 |
| Laminate | Fabrication method | Water bonding | Water bonding | Water bonding | Water bonding | Water bonding | Water bonding | Water bonding | Water bonding | Water bonding | Water bonding | Water bonding |
| | Adhesive strength F0 | 2.7 | 2.7 | 1.5 | 1.5 | 0.05 | 0.06 | 0.06 | 1.5 | 1.5 | 0.06 | 1.5 |
| | Evaluation of F0 | Excellent | Excellent | Favorable | Favorable | Acceptable | Acceptable | Acceptable | Favorable | Favorable | Acceptable | Favorable |
| | Adhesive strength Ft | 10 | 8 | 3 | 3.1 | 0.06 | 0.07 | 0.07 | 2.3 | 2.7 | Poor | Poor |
| | Rate of increase in close contact force (%) | 270 | 196 | 100 | 107 | 20 | 17 | 17 | 53 | 80 | Poor | Poor |
| | Evaluation of rate of increase | Excellent | Excellent | Excellent | Excellent | Favorable | Favorable | Favorable | Favorable | Favorable | Poor | Poor |
| Comprehensive evaluation | Judgement | Excellent | Excellent | Excellent | Excellent | Acceptable | Acceptable | Acceptable | Favorable | Favorable | Poor | Poor |

TABLE 2

| | | Example 10 | Example 11 | Example 12 | Example 13 | Example 14 | Example 15 | Example 16 | Example 17 | Comparative Example 3 |
|---|---|---|---|---|---|---|---|---|---|---|
| Heat-resistant polymer film | Kind | XENOMAX | XENOMAX | XENOMAX | XENOMAX | XENOMAX | XENOMAX | XENOMAX | XENOMAX | XENOMAX |
| | Thickness (μm) | 15 | 15 | 15 | 15 | 15 | 15 | 15 | 15 | 15 |
| Adhesive layer | Kind | KBM903 | KBM903 | KBM903 | KBM903 | KBM903 | KBM903 | KBM903 | KBM903 | KBM903 |
| | Coating method | Gaseous phase coating method | Gaseous phase coating method | Gaseous phase coating method | Gaseous phase coating method | Gaseous phase coating method | Gaseous phase coating method | Gaseous phase coating method | Gaseous phase coating method | Gaseous phase coating method |
| | Formed material | Metal base material | Metal base material | Metal base material | Metal base material | Metal base material | Metal base material | Metal base material | Metal base material | Metal base material |
| | Thickness (μm) | 0.02 | 0.02 | 0.02 | 0.02 | 0.02 | 0.02 | 0.02 | 1.00 | 0.02 |
| Metal base material | Kind | Copper | Copper | Copper | Copper | Copper | Rolled copper foil | Electrolytic copper foil | Copper | Copper |
| | Thickness (mm) | 0.5 | 0.5 | 0.5 | 0.5 | 0.5 | 0.06 | 0.06 | 0.5 | 0.5 |
| | Surface roughness Ra (μm) | 0.05 | 0.12 | 0.52 | 1.0 | 3.0 | 0.2 | 2.0 | 5.0 | 5.0 |
| | Thickness of adhesive layer/surface roughness Ra of metal base material | 0.40 | 0.17 | 0.04 | 0.02 | 0.007 | 0.10 | 0.01 | 0.20 | 0.004 |
| Laminate | Fabrication method | Water bonding | Water bonding | Water bonding | Water bonding | Water bonding | Water bonding | Water bonding | Water bonding | Water bonding |
| | Adhesive strength F0 | 18 | 2.7 | 1 | 0.1 | 0.06 | 2 | 0.08 | 0.05 | Peeled off |
| | Evaluation of F0 | Excellent | Excellent | Favorable | Acceptable | Acceptable | Favorable | Acceptable | Acceptable | Extremely Poor |
| | Adhesive strength Ft | 19 | 10 | 3 | 0.34 | 0.1 | 7.7 | 0.3 | 0.1 | — |
| | Rate of increase in close contact force (%) | 6 | 270 | 200 | 240 | 67 | 285 | 275 | 100 | — |
| | Evaluation of rate of increase | Favorable | Excellent | Excellent | Excellent | Favorable | Excellent | Excellent | Excellent | — |
| Comprehensive evaluation | Judgement | Favorable | Excellent | Favorable | Acceptable | Acceptable | Favorable | Acceptable | Acceptable | Extremely Poor |

TABLE 3

| | | Example 18 | Example 19 | Example 20 | Example 21 | Example 22 | Example 23 | Example 24 |
|---|---|---|---|---|---|---|---|---|
| Heat-resistant polymer film | Kind | XENOMAX | XENOMAX | XENOMAX | XENOMAX | XENOMAX | XENOMAX | XENOMAX |
| | Thickness (μm) | 15 | 15 | 15 | 15 | 15 | 15 | 15 |
| Adhesive layer | Kind | KBM903 | KBM903 | KBM903 | KBM903 | KBM903 | KBM903 | KBM903 |
| | Coating method | Gaseous phase coating method | Gaseous phase coating method | Gaseous phase coating method | Gaseous phase coating method | Gaseous phase coating method | Gaseous phase coating method | Gaseous phase coating method |
| | Formed material | Metal base material | Metal base material | Metal base material | Metal base material | Metal base material | Metal base material | Metal base material |
| | Thickness (μm) | 0.02 | 0.02 | 0.02 | 0.02 | 0.02 | 0.02 | 0.02 |
| Metal base material | Kind | Inconel | Iron | Brass | SK steel | Nickel-plated iron | Nickel-plated copper | Monel |
| | Thickness (mm) | 0.5 | 0.5 | 0.5 | 0.5 | 0.5 | 0.5 | 0.5 |
| | Surface roughness Ra (μm) | 0.12 | 0.10 | 0.10 | 0.10 | 0.10 | 0.10 | 0.10 |
| | Thickness of adhesive layer/surface roughness Ra of metal base material | 0.17 | 0.20 | 0.20 | 0.20 | 0.20 | 0.20 | 0.20 |
| Laminate | Fabrication method | Water bonding | Water bonding | Water bonding | Water bonding | Water bonding | Water bonding | Water bonding |
| | Adhesive strength F0 | 2.7 | 2.6 | 2.7 | 2.7 | 2.7 | 2.7 | 2.6 |
| | Evaluation of F0 | Excellent | Excellent | Excellent | Excellent | Excellent | Excellent | Excellent |
| | Adhesive strength Ft | 10 | 5 | 7 | 4 | 3 | 3 | 3 |
| | Rate of increase in close contact force (%) | 270 | 92 | 159 | 48 | 11 | 11 | 15 |
| | Evaluation of rate of increase | Excellent | Favorable | Excellent | Favorable | Favorable | Favorable | Favorable |
| Comprehensive evaluation | Judgement | Excellent | Favorable | Excellent | Favorable | Favorable | Favorable | Favorable |

TABLE 4

| | | Example 25 | Example 26 | Example 27 | Example 28 | Comparative Example 4 | Comparative Example 5 | Comparative Example 6 | Comparative Example 7 |
|---|---|---|---|---|---|---|---|---|---|
| Heat-resistant polymer film | Kind | XENOMAX | XENOMAX | XENOMAX | XENOMAX | XENOMAX | XENOMAX | XENOMAX | XENOMAX |
| | Thickness (μm) | 15 | 15 | 15 | 15 | 15 | 15 | 15 | 15 |
| Adhesive layer | Kind | KBM903 | KBM903 | KE103 | X-12-972F | TB1222C | S-1511X | POLYNATE 955H | X-71-8094-5A/B |
| | Coating method | Hand coating method | Hand coating method | Hand coating method | Hand coating method | Hand coating method | Hand coating method | Hand coating method | Hand coating method |
| | Formed material | Metal base material | Metal base material | Metal base material | Metal base material | Metal base material | Metal base material | Metal base material | Metal base material |
| | Thickness (μm) | 10 | 10 | 10 | 10 | 10 | 10 | 10 | 10 |
| Metal base material | Kind | SUS | SUS | SUS | SUS | SUS | SUS | SUS | SUS |
| | Thickness (mm) | 0.5 | 0.5 | 0.5 | 0.5 | 0.5 | 0.5 | 0.5 | 0.5 |
| | Surface roughness Ra (μm) | 0.05 | 0.05 | 0.05 | 0.05 | 0.05 | 0.05 | 0.05 | 0.05 |
| | Thickness of adhesive layer/surface roughness Ra of metal base material | 200 | 200 | 200 | 200 | 200 | 200 | 200 | 200 |
| Laminate | Fabrication method | Lamination | Pressing | Lamination | Lamination | Lamination | Lamination | Lamination | Lamination |
| | Adhesive strength F0 | 0.07 | 0.1 | 0.3 | 0.06 | Peeled off | 18 | 17 | 12 |
| | Evaluation of F0 | Acceptable | Acceptable | Acceptable | Acceptable | Extremely Poor | Excellent | Excellent | Excellent |
| | Adhesive strength Ft | 0.21 | 0.3 | 0.32 | 0.2 | — | Peeled off | Peeled off | Peeled off |
| | Rate of increase in close contact force (%) | 200 | 200 | 7 | 233 | — | — | — | — |
| | Evaluation of rate of increase | Excellent | Excellent | Favorable | Excellent | — | Poor | Poor | Poor |
| Comprehensive evaluation | Judgement | Acceptable | Acceptable | Acceptable | Acceptable | Extremely Poor | Poor | Poor | Poor |

TABLE 5

| | | Example 29 | Example 30 | Example 31 | Example 32 | Example 33 | Example 34 | Comparative Example 8 | Comparative Example 9 |
|---|---|---|---|---|---|---|---|---|---|
| Heat-resistant polymer film | Kind | XENOMAX | XENOMAX | XENOMAX | XENOMAX | XENOMAX | XENOMAX | XENOMAX | XENOMAX |
| | Thickness (μm) | 15 | 15 | 15 | 15 | 15 | 15 | 15 | 15 |
| Adhesive layer | Kind | KBM-602 | KBM573 | KBM903 | KBM903 | KBM903 | KBM903 oligomer | KBM903 | KBM903 |
| | Coating method | Gaseous phase coating method | Gaseous phase coating method | Gaseous phase coating method | Spin coating | Spin coating | Hand coating | Hand coating | Hand coating |
| | Formed material | Metal base material | Metal base material | Polymer film | Metal base material | Polymer film | Metal base material | Metal base material | Polymer film |
| | Thickness (μm) | 0.02 | 0.02 | 0.02 | 0.01 | 0.01 | 0.02 | 60 | 60 |
| Metal base material | Kind | SUS | SUS | SUS | SUS | SUS | SUS304 | SUS | SUS |
| | Thickness (mm) | 0.03 | 0.02 | 0.5 | 0.5 | 0.5 | 0.5 | 0.5 | 0.5 |
| | Surface roughness Ra (μm) | 0.05 | 0.05 | 0.05 | 0.05 | 0.05 | 0.05 | 0.05 | 0.05 |
| | Thickness of adhesive layer/surface roughness Ra of metal base material | 0.40 | 0.40 | 0.40 | 0.20 | 0.20 | 0.40 | 1200 | 1200 |
| Laminate | Fabrication method | Water bonding | Water bonding | Water bonding | Lamination | Lamination | Water bonding | Lamination | Lamination |
| | Adhesive strength F0 | 2.6 | 1 | 2.7 | 0.5 | 0.5 | 1.6 | Peeled off | Peeled off |
| | Evaluation of F0 | Excellent | Favorable | Excellent | Acceptable | Acceptable | Favorable | Extremely Poor | Extremely Poor |
| | Adhesive strength Ft | 7 | 1.1 | 10 | 0.6 | 0.6 | 4.1 | — | — |
| | Rate of increase in close contact force ( %) | 169 | 10 | 270 | 20 | 20 | 156 | — | — |
| | Evaluation of rate of increase | Excellent | Favorable | Excellent | Favorable | Favorable | Excellent | — | — |
| Comprehensive evaluation | Judgement | Excellent | Favorable | Excellent | Acceptable | Acceptable | Excellent | Extremely Poor | Extremely Poor |

INDUSTRIAL APPLICABILITY

By using the laminate of the present invention, it is possible to ease the processing conditions (expand the process window) and increase the service life of probe cards, flat cables, and the like as well as (insulated type) heaters, electrical or electronic substrates, back sheets for solar cells, and the like. Furthermore, a roll-shaped laminate is easy to transport and store.

The invention claimed is:

1. A laminate comprising a heat-resistant polymer film, an adhesive layer, and a metal base material laminated in this order, wherein the metal base material has an arithmetic mean roughness Ra of more than 0.05 μm, the adhesive layer has a thickness that is 0.05 times or more the arithmetic mean roughness Ra of the metal base material, the thickness of the adhesive layer is 0.02 μm or more, the adhesive layer is a silane coupling agent-derived adhesive layer and/or a silicone-derived adhesive layer, the heat-resistant polymer film is an aromatic polyimide film having a benzoxazole structure, an adhesive strength F0 of the laminate before the following long-term heat resistance test by a 90-degree peel method is 0.05 N/cm or more and 20 N/cm or less, and an adhesive strength Ft of the laminate after the following long-term heat resistance test by a 90-degree peel method is greater than the F0:

[long-term heat resistance test]

the laminate is left to still stand and stored at 350° C. for 500 hours in a nitrogen atmosphere.

2. The laminate according to claim 1, wherein the metal base material contains a 3d metal element.

3. The laminate according to claim 1, wherein the metal base material is one or more selected from the group consisting of SUS, copper, brass, iron, and nickel.

4. A probe card comprising the laminate according to claim 1 as a constituent component.

5. A flat cable comprising the laminate according to claim 1 as a constituent component.

6. A heating unit comprising the laminate according to claim 1 as a constituent component.

7. An electrical or electronic substrate comprising the laminate according to claim 1 as a constituent component.

8. A solar cell comprising the laminate according to claim 1 as a constituent component.

9. The laminate according to claim 1, wherein the metal base material has an arithmetic mean roughness Ra of 0.07 μm or more.

10. The laminate according to claim 9, wherein the metal base material contains a 3d metal element.

11. The laminate according to claim 9, wherein the metal base material is one or more selected from the group consisting of SUS, copper, brass, iron, and nickel.

12. A probe card comprising the laminate according to claim 9 as a constituent component.

13. A flat cable comprising the laminate according to claim 9 as a constituent component.

14. A heating unit comprising the laminate according to claim 9 as a constituent component.

15. An electrical or electronic substrate comprising the laminate according to claim 9 as a constituent component.

16. A solar cell comprising the laminate according to claim 9 as a constituent component.

17. The laminate according to claim 1, wherein the metal base material has an arithmetic mean roughness Ra of 0.1 μm or more.

* * * * *